United States Patent [19]

Scanlan et al.

[11] Patent Number: 4,898,442
[45] Date of Patent: Feb. 6, 1990

[54] NON-INTRUSIVE FIBRE OPTIC TAP

[75] Inventors: Ian F. Scanlan; Alan Robinson, both of Harlow, Great Britain

[73] Assignee: STC PLC, London, England

[21] Appl. No.: 308,115

[22] Filed: Feb. 8, 1989

[30] Foreign Application Priority Data

Feb. 11, 1988 [GB] United Kingdom ............... 8803159

[51] Int. Cl.⁴ .......................... G02B 6/26; H01J 5/16
[52] U.S. Cl. ............................. 350/96.15; 350/96.16; 350/96.18; 350/96.19; 350/96.29; 250/227
[58] Field of Search ............... 350/96.10, 96.15, 96.16, 350/96.17, 96.18, 96.19, 96.20, 96.29; 250/227

[56] References Cited

U.S. PATENT DOCUMENTS

| 3,931,518 | 1/1976 | Miller | 250/227 |
|---|---|---|---|
| 4,019,051 | 4/1977 | Miller | 250/227 |
| 4,135,780 | 1/1979 | Dyott | 350/96.15 |
| 4,253,727 | 3/1981 | Jeunhomme et al. | 350/96.15 |
| 4,696,535 | 9/1987 | Saha | 350/96.15 |
| 4,749,246 | 6/1988 | Epworth et al. | 350/96.15 |
| 4,749,248 | 6/1988 | Aberson, Jr. et al. | 350/96.19 |
| 4,761,833 | 8/1988 | Epworth | 350/96.19 X |
| 4,768,851 | 9/1988 | Shaw et al. | 350/96.15 |
| 4,781,428 | 11/1988 | Epworth et al. | 350/96.19 |
| 4,801,189 | 1/1989 | Shaw et al. | 350/96.15 |
| 4,807,954 | 2/1989 | Oyamada et al. | 350/96.15 |
| 4,834,482 | 5/1989 | Campbell et al. | 350/96.15 |

FOREIGN PATENT DOCUMENTS

| 1596405 | 8/1981 | United Kingdom | 350/96.15 X |
|---|---|---|---|
| 2161609 | 1/1986 | United Kingdom | 350/96.19 X |
| 2182516 | 5/1987 | United Kingdom | 350/96.15 X |

Primary Examiner—William L. Sikes
Assistant Examiner—Brian M. Healy
Attorney, Agent, or Firm—Lee, Mann, Smith, McWilliams & Sweeney

[57] ABSTRACT

A ribbed structure (60a), co-operating with an unribbed surface of a coupling element 64, is employed to introduce microbending in an optical fibre (51) intermediate its two ends with a periodicity which couples the fundamental bound mode of the fibre into a cladding mode from which optical power is tapped into the optical coupling element (64) provided with a conical reflecting surface (63a) for collimating the extracted light. Light injection is achieved by a reciprocal process using a ribbed structure (60b) and a conical reflecting surface 63b.

11 Claims, 6 Drawing Sheets

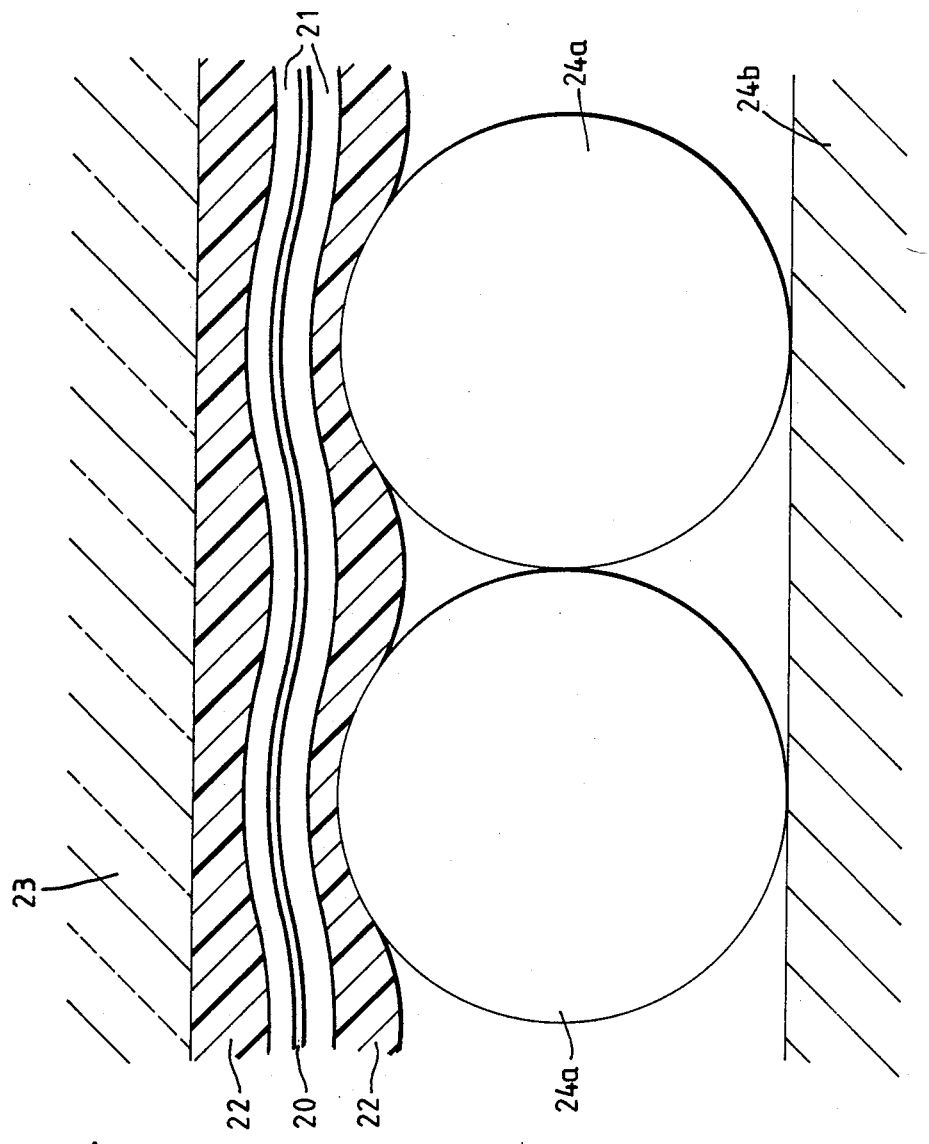

NON-INTRUSIVE FIBRE OPTIC TAP

BACKGROUND OF THE INVENTION

This invention relates to non-intrusive tap means for injecting light into, and extracting light from, the bound modes of a fibre consisting of a core whose refractive index is higher than that of the surrounding optically transparent cladding. Core and cladding are typically manufactured from silica based glasses, but other optically transparent materials may be used. The fibre may optionally be surrounded by a protective coating whose refractive index is greater than that of the optical cladding, and which does not absorb strongly at the wavelengths of interest. Examples of materials of such coatings include epoxy-acrylate, urethane, and some silicone resins. Fibres are conventionally cylindrically symmetric, but this is not essential for the purposes of this invention.

The present invention is preferably applied to fibres which are single moded or few moded at the wavelengths of interest. In multimode fibres the performance of taps based on bending or microbend induced coupling is sensitive to the initial modal power distribution between the bound modes of the fibre. As a result, the performance of such taps on multimode fibres may vary widely, depending on the power distribution launched into the fibre, the degree of mode coupling in the fibre, and the spacing between taps in a system in which more than one tap is applied. In single mode fibre such problems are avoided.

It is convenient to consider the extraction of light from the bound modes of the fibre in three stages as follows. First, the fibre is perturbed so as to induce coupling between one or more of the bound modes and one or more of the cladding modes. Second, the cladding power is transmitted across the boundary between the cladding and the protective coating or surrounding medium. Third, the radiated light is collected and focussed onto a suitable detector Light injection is achieved by a reciprocal process, i.e. all the rays may be reversed in direction, and the detector replaced by a light source. The principal difference is that if a coherent source such as a semiconductor laser is used for injection, it is advantageous to minimise the aberrations in the imaging optics as far as possible in order to maximise the power transferred to a particular mode. The sensitive area of a semiconductor detector will typically be much larger than the emitting area of a laser, and good collection efficiency is achievable with less highly corrected optics.

Coupling between the bound and cladding modes is achieved by applying a suitable perturbation to the fibre. For coupling between the fundamental $LP_{01}$ mode and a higher order mode with azimuthal mode number unity, this is achieved most conveniently by a periodic bending of the fibre core The optimum bending pitch for resonant coupling is inversely related to the difference in propagation constants, or axial components of the wavevector, for the two modes, and should be close to the period of beats between the two modes, as described in UK Patent Application GB 2182516A. The pitch can be calculated to acceptable accuracy by solving the scalar wave equation for the two waveguide modes at the wavelengths of interest, or by measuring the attenuation induced in the fibre by periodic bends of known pitch.

The bend amplitude needed to transfer a useful fraction of the available power by resonant coupling between two modes is very small, typically a fraction of one micrometre for a periodic bend of pitch 0.2 to 1.0mm applied over a few millimetres length of the fibre.

In situations where the optical cladding is contacted by a higher refractive index medium, such as a coating, the cladding modes to which power is coupled from the bound modes are not true eigenmodes of the core/cladding/coating structure because power is lost at each reflection at the cladding/coating boundary. For typical telecommunications fibres, the wavevector of the lowest order cladding modes that are most readily excited are nearly parallel to the fibre axis. Consequently, the Fresnel reflection coefficient at the boundary with the coating is almost unity, and power may propagate for several centimetres or more with relatively low losses if the fibre is straight Low losses enhance the resonant coupling of power between the bound and cladding modes, but inhibit the transfer of power across the cladding/coating boundary.

This problem can be somewhat alleviated by applying a periodic perturbation of higher spatial frequency than is required for resonant coupling to low order cladding modes so that higher order cladding modes may be selectively excited, or coupled into the fundamental bound mode. This may be achieved by pressing a periodic undulation or grating of shorter pitch against the fibre. The higher order modes propagate at a greater angle to the interface, and so have a lower Fresnel reflection coefficient, and higher transmission coefficient.

From the foregoing it will be evident that the light emanating from the fibre as the result of the deliberately induced microbending emerges over an area with a relatively high aspect ratio which typically measures several millimetres in length but not more than about 0.1 to 0.5mm in width. For light coupled from the fundamental mode into a specific cladding mode, this light will emerge at a specific angle to the fibre to emerge within a fairly narrow range of angles to the fibre axis, and with the azimuthal distribution of that light being dependent upon the geometry of the microbending. To detect that light efficiently requires an optical system which will collect a high proportion of the emanating light from this high aspect ratio source, and focus it on a detector to an image having a size and shape matched with that of the photosensitive surface of that detector. A similar optical system is similarly required for coupling light from a source efficiently into the fibre, though in this instance rather better quality of optical system may be necessary because though, on the extraction side, it is generally not difficult to accommodate optical imaging aberrations by choice of a detector with a larger photosensitive area; it is not so easy on the insertion side to accommodate aberrations by changing to a smaller area source.

In U.S. Pat. No. 4 253 727, to which attention is directed, there is described a coupling device in which a multimode optical fibre is clamped between two transversely corrugated parts of the device in order to induce mode coupling and consequent leakage of light propagating in the fibre into the two part device. It is explained that this configuration is in principal able to collect and collimate, by means of a conical reflecting or refracting surface all light launched from the fibre into the device at an angle $\theta$ to the unperturbed fibre axis over the whole range of azimuth angle φ from 0° to 360°

SUMMARY OF THE INVENTION.

The present invention is directed to a coupling device in which an optical fibre is similarly gripped between two surfaces in order to induce mode coupling and consequent leakage of light propagating in the fibre, but in which the clamping is between two surfaces of which only one is transversely corrugated. Light collection is in this instance restricted to that launched via the surface without transverse corrugations, and hence the range of azimuthal angle over which light collection occurs is less than 180°. For use with single mode fibre, the consequent reduction in efficiency of light collection is however more than offset by the increased efficiency of focussing that can be obtained resulting from the lack of transverse corrugations.

According to the present invention there is provided a coupling device for coupling light into or out of an optical fibre intermediate of its two ends, which device induces microbending of the optical fibre with a spatial periodicity to effect optical coupling between the fundamental bound mode of the fibre and a cladding mode by gripping the fibre between first and second surfaces respectively of a coupling element and a co-operating member, wherein said second surface is transversely ribbed and said first surface extends rectilinearly in the axial direction of the fibre and has no transverse ribbing.

BRIEF DESCRIPTION OF THE DRAWINGS

There follows a description of non-intrusive taps incorporating coupling devices embodying the invention in preferred forms. This description is prefaced for comparison purposes with a brief description of a prior art non-intrusive tap. The description refers to the accompanying drawings in which:

FIG. 4 depicts a modified form of the means of FIGS. 2 and 3.

DETAILED DESCRIPTION OF PREFERRED EMBODIMENTS.

Figure 1:
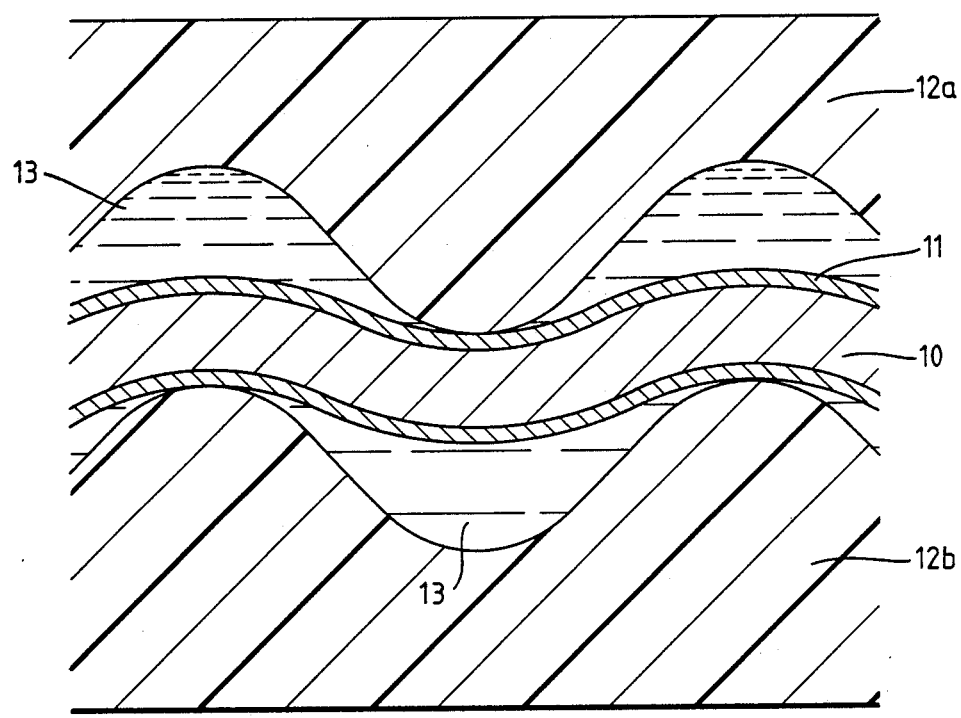
FIG. 1 depicts a portion of a prior art means for effecting coupling between bound modes of a multimode optical fibre and cladding modes.

Referring to FIG. 1, a multimode optical fibre, comprising an optical core 10 that is 85 [m in diameter encased in an optical cladding 11 of material of lower refractive index, is clamped between the two parts 12a and 12b of a two-part coupler block made of transparent material of higher refractive index than that of the material of the optical cladding 11 of the optical fibre. The two surfaces between which the fibre is clamped are provided with transverse ribs (corrugations) of complementary form and of a suitable pitch (typically about 2mm) to distort the fibre and thus produce mode coupling and consequent leakage of light into the coupler from bound modes propagating in the undistorted fibre. The residual voids 13 between the optical cladding 11 of the fibre and the coupler are filled with an oil whose refractive index is intermediate that of the cladding and that of the coupler block 12. For each bound mode of the light propagating in the fibre, the light that leaks into the coupler block as a result of this distortion will be launched into the fibre's optical cladding centred on a specific conic angle with respect to the local axial direction of the fibre. This light will be refracted at the curved interface between the cladding 11 and the oil 13 and again at the curved interface between the oil 13 and the coupler block 12. Therefore the light that leaks into the block is not all propagating at a specific angle θ to the axis of the undistorted fibre, but is instead spread over a certain range of conic angle. If it were propagating at a single angle, the light could then be collimated by a conical refracting or reflecting surface (not shown), and then brought to a well-defined focus (not shown). The presence of a range of angles means that the focus is rather less well defined, but it may typically still be small enough for adequate imaging upon the photosensitive area of a detector (not shown). If the position of the photodetector is taken by a light emissive diode, then light from that diode will be launched into the coupler block, and a proportion of that light will be coupled into the optical fibre in bound modes of that fibre.

A typical single mode fibre has a core diameter about ten times smaller than that of the multimode fibre of FIG. 1. If such a single mode fibre were gripped between the two halves of the coupler block 12, a proportion of any light propagating in the bound mode of that fibre would, as before, leak into the block as the result of mode mixing produced by the corrugations imposed upon that fibre by the block. Since the undistorted fibre has only one bound mode, the leaking light is relatively strongly centred around one specific conic angle with respect to the local axial direction of the fibre. With single mode fibre the amplitude of the distortion in the fibre core necessary to produce the requisite mode mixing is typically about one thousand times smaller than the pitch, and hence the local axial direction of the distorted fibre is not at any point along the fibre significantly different from the axial direction of the undistorted fibre. Therefore the light leaking from the single mode fibre is all relatively strongly centred around one specific conic angle with respect to the axial direction of the undistorted fibre. The range of conic angle is however expanded as that light is refracted by the curved interface between the oil 13 and the coupling block 12 because the angle of incidence of the light upon that interface is a periodic function of position along the length of the fibre. The resulting angular spread is no greater than that produced with the the multimode fibre, and so collecting the light upon the photosensitive surface of a photodetector can readily be performed with the same efficiency as in achievable when using multimode fibre. On the other hand the efficiency of launching light into the single mode fibre from a laser is clearly going to be impaired by the spread of the conic angle induced by refraction effects since, in the absence of such effects, the collimated beam of light from a laser can be matched with the relatively sharply defined conic acceptance angle of the fibre by reflection or refraction of the collimated light at a single conical surface.

U.S. Pat. No. 4 253 727, to which previous reference has been made, make no reference to the presence of any form of coating protecting the outer surface of the optical cladding of the fibre, and so no such coating is either illustrated in FIG. 1 or referred to in the forgoing description relating to that Figure. Typically, however, optical fibres are made of glass, and the glass surface of such a fibre is almost invariably provided with a plastics protective coating immediately the fibre is made in order to minimise the degradation of the strength of the fibre from the value obtaining when it is in its pristine state. A plastics protective coating of this sort is typically much softer than the underlying glass, and hence will be appreciably compressed by the raised portions of the ribs of the coupler 12, and so provide a further appreciably curved refracting surface at the interface between such a coating and the oil 13.

At first sight it might appear that these problems associated with refraction at curved surfaces could be substantially eliminated by reducing the amplitude of the ribs on the two parts of the coupler block 12 to the value wanted for the fibre core, but this is not a practical option. Not only would there be severe difficulties in providing the two parts of the coupler block 12 with well-profiled ribs having an amplitude of less than 1 $\mu$m; even if it were achieved, it could not produce the requisite distortion of the fibre core because the compliance of the plastics protective coating would fully accommodate the profile of the coupler block surfaces without transmitting that profile across to the underlying glass of the fibre.

Figure 2:
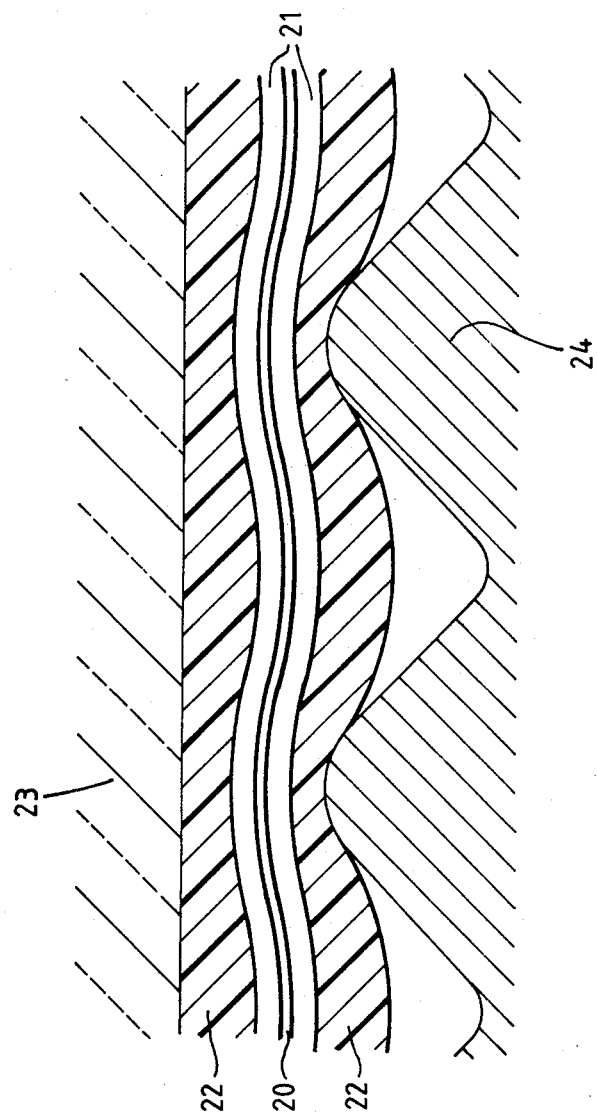
FIGS. 2 and 3 depict means for effecting an optical coupling between the fundamental bound mode of an optical fibre and a cladding mode.
Figure 3:
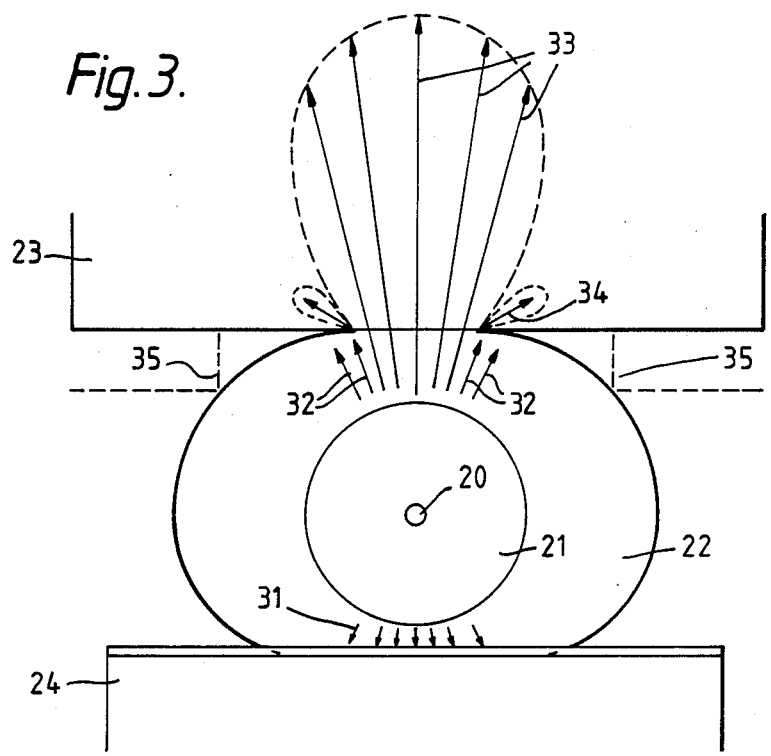

These problems are however capable of being substantially eliminated by inducing the requisite distortion of the fibre by clamping it between a ribbed surface and a plane surface in the manner depicted schematically in FIGS. 2 and 3. Here a glass optical fibre optical fibre constituted by an optical cladding 21 is encased in a lower modulus plastics protective coating 22, and is gripped between upper and lower jaws 23 and 24 respectively provided with a plane surface and a ribbed surface.

Under appropriate clamping conditions, and with the appropriate pitch of the ribs, the microbending that is caused by the ribbed surface causes mode coupling and consequent leakage of light from the fibre into its protective coating 22 with an azimuthal distribution indicated by the arrows 31 and 32 of FIG. 3. This light then leaks into the upper jaw 13, which also constitutes the coupling element of the device, most efficiently where the coating is in direct contact with the coupling element, as depicted by arrows 33. The width of this area of contact determines the azimuthal angular divergence of the light entering the coupling element. Too wide an area of contact, and the spread is so great that an excessive proportion of the light fails to be usefully collected; too narrow an area of contact, and diffraction effects will again broaden the angular spread excessively. Diffraction effects may also produce side lobes such as those depicted at 34.

In the preceding paragraph the coupling element 23 has been described as having a plane surface for clamping against the protective coating 22, but it is generally preferred to provide this surface with a single longitudinal channel for providing positive location of the fibre. In FIG. 3 the sides of such a channel are shown in broken outline at 35. In FIG. 2 the ribbed surface of the lower jaw 24 is represented as being provided by an undulating surface of a monolithic block. An alternative way of providing these ribs is as depicted in FIG. 4 in which an array of uniform diameter fibres 24a, made for instance of fused silica, are secured in side contact with each other on the plane face of a block 24b.

Figure 5:
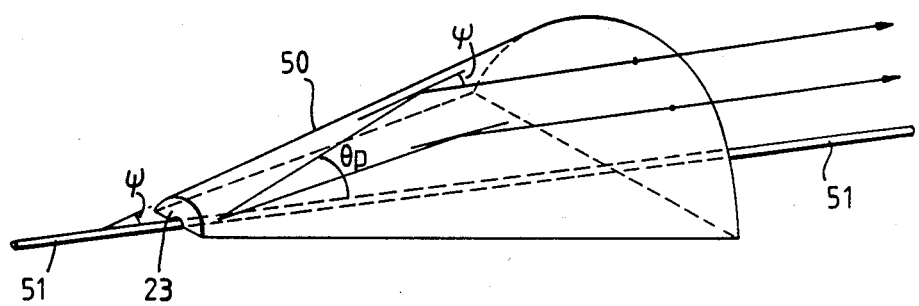
FIGS. 5, 6 and 7 depict different embodiments of optical coupling element.
Figure 6:
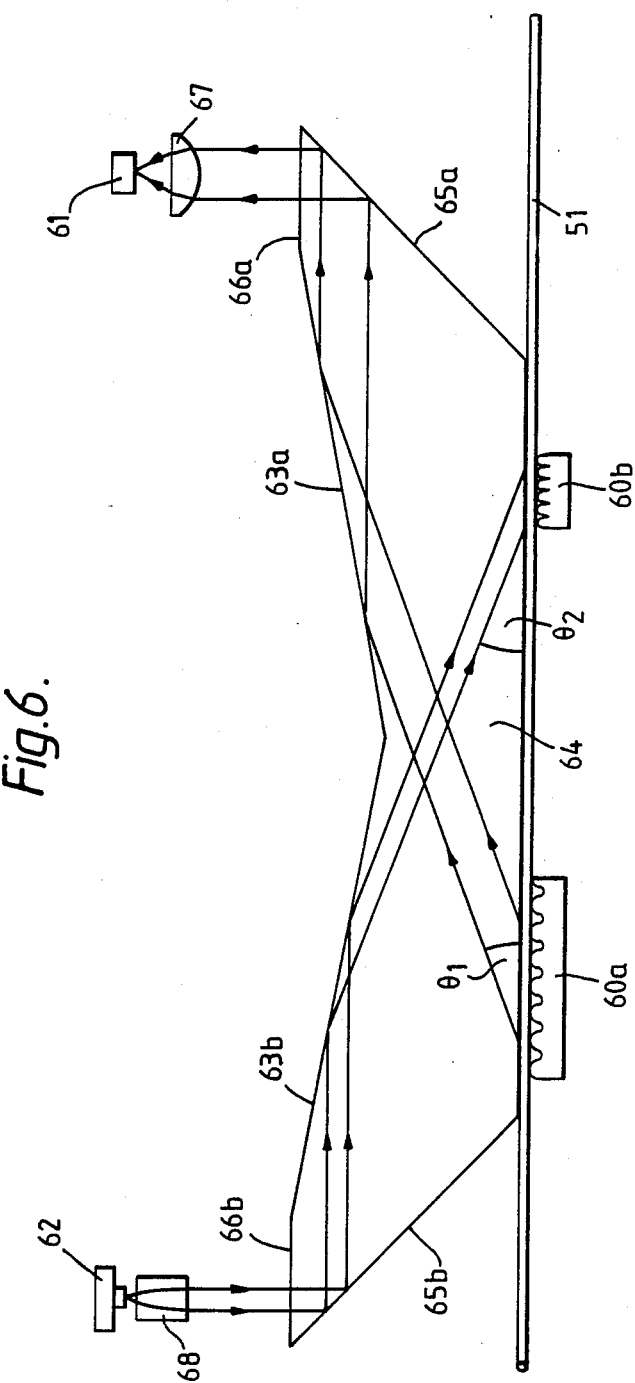

Having regard to the fact that the light coupled out of the fibre by the microbending into a particular cladding mode is launched into the coupling element centred at a particular angle 8 to the fibre axis, and to the fact that this light has an azimuthal distribution of the general form depicted in FIG. 3, a preferred geometry of coupling element 23 as depicted in FIG. 5 has a conical 50 reflecting surface with a semi-vertical angle of $\psi = \theta_2$. The fibre 51 (comprising core 20 cladding 21 and protective coating 22 not separately shown) extends along the axis of the cone. Reflection at the curved surface may be produced by arranging conditions to ensure total internal reflection at this interface or by metallising this surface. Geometrical analysis reveals that light launched into the coupling element at an angle $\theta$ to its axis becomes collimated after making a single reflection at the curved surface. If, after making this single reflection, the light emerges from a plane facet, it can be brought to a focus on a detector (not shown) by means of a single lens (not shown). FIG. 6 depicts an arrangement that employs a first ribbed surface 60a for inducing microbending in order to extract light from the plastics protection coated fibre 51 for detection at a detector 61, and a second ribbed surface 60b for inducing microbending in order to allow light from a source 62 to be injected into the fibre. In principle the same ribbed surface can be used for both purposes, but the use of separate ribbed surfaces allows the use of a shorter optical coupling element 64. Furthermore the use of two ribbed surfaces, instead of only one, enables different pitches to be used for injection and extraction, thereby facilitating the possibility of using a system in which light of one wavelength is extracted from the fibre and fed to the detector 61, while light of a significantly different wavelength emitted by the source 62 is employed for injection into the fibre. The coupling element 64 has first and second conical reflecting surfaces 63a and 63b, both having their axis extending collimearly along the axis of the fibre 51. The pitches of the ribbed surfaces 60a and 60b are chosen respectively to couple light from the fibre into the coupling element at an angle 8 and to couple light into the fibre from the coupling element at an angle $\theta_2$ 82 in the coupling element. Hence the semi-vertical angle of the cones of conical surfaces are respectively $\theta_1/2$ and $\theta_2/2$. necessarily, $\theta_2$ is made the same as $\theta_2$). The coupling element is further provided with two plane reflecting facets 65a and 65b, a plane exit window 66a and a plane entrance window 66b. A first lens 67 is positioned to bring the collimated light emerging from exit window to a focus at the detector 51, while a second lens 68 which may be a graded index lens is positioned to collimate light from source 62 and direct that light at the appropriate angle into the plane entrance window 66b. The entrance and exit windows are not necessarily oriented so that light is incident normally upon them, and indeed oblique incidence may be preferred to avoid certain reflection problems.

Figure 7:
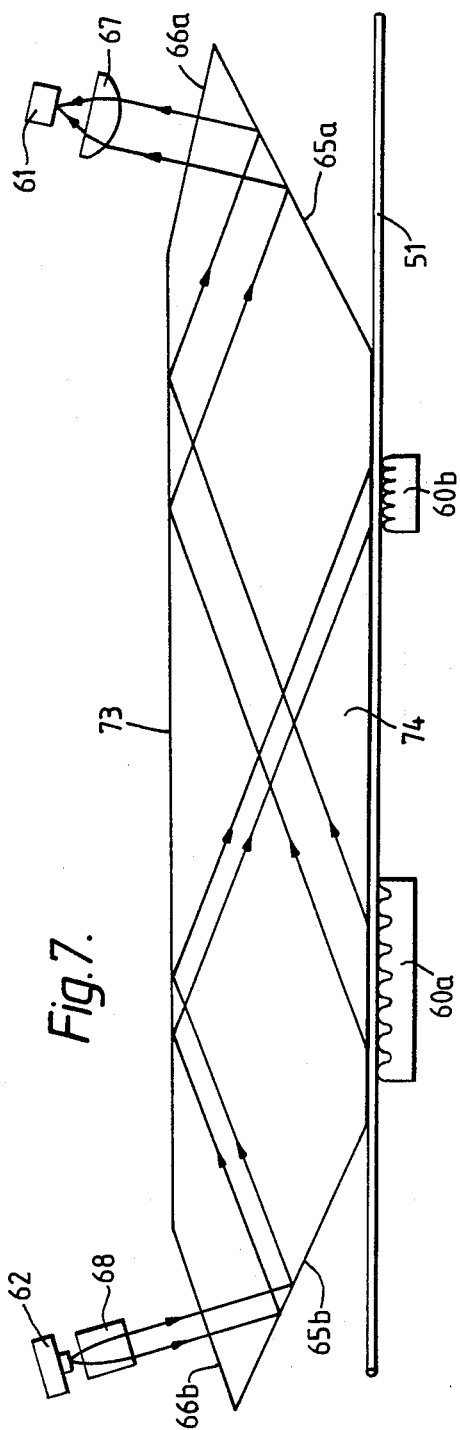

It is found that little loss of optical efficiency is suffered if, instead of providing conical reflecting surfaces 63a and 63b as depicted in FIG. 6, a single cylindrical reflecting surface 73 is used in their place as depicted in FIG. 7. The fibre 51 now extends along the focal line of this reflecting surface. In the case of this coupling element 74 of FIG. 7 light extracted from the fibre 51 that is launched into the coupling element and is reflected in the cylindrical surface 73 is directed by that reflection back towards the fibre, whereas in the case of coupling element 64 of FIG. 6 that reflected light is directed parallel with the fibre axis. Accordingly it is convenient to orient the reflecting facets 65a and window 66a slightly differently in the two instances. Similar considerations apply also to the orientation of reflecting facet 65b and window 66b.

Figure 8:
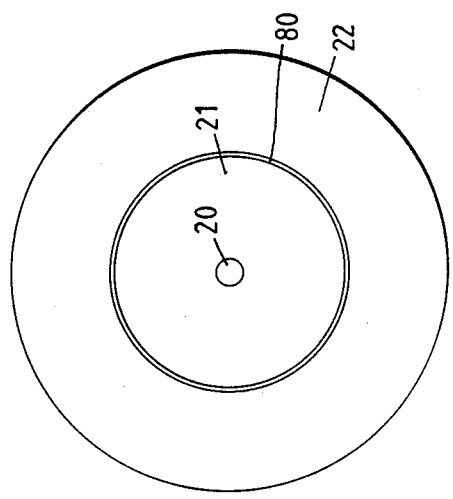
FIG. 8 depicts a special form of protective coating optical fibre.

Previous reference has been made to the fact that Fresnel reflection occurs at the interface between the optical cladding 21 of the fibre and the surrounding protective coating 12, and to the fact that this reflection is particularly significant for coupling devices in which light is coupled into or out of the fundamental bound mode by way of low order cladding modes. It has also been stated that problems encountered as a result of this Fresnel reflection can in some instances be alleviated by choosing to work with higher order cladding modes because the wavevector associated with a higher order mode has a smaller angle of incidence in comparison with that of a lower order mode. In instances where for some reason it is not appropriate to resort to the use of higher order cladding modes, or where even though higher order cladding modes are used, the Fresnel reflection at the interface between the cladding and the protective coating would otherwise be inconveniently high, this problem can be alleviated by the use of a special construction of the protective coated fibre which incorporates an antireflection coating between the optical cladding and the main body of the protective coating. Such a fibre construction is depicted in FIG. 8. The optical fibre core 20 is provided with a conventional optical fibre cladding 21, but between this cladding 21 and the main body of a protective coating 22 is a thin layer 80 that comprises an antireflection coating having a refractive index intermediate that of the optical cladding and that of the main body of the protective coating and a thickness in the range 0.2 to 3.0μ typically being at least 0.5μm thick. The optimum thickness and refractive index of this antireflection coating layer may be calculated as follows: Index of antireflection layer $$n_a = n_c0.5 \; n_j0.5$$

wherein $n_c$ is the refractive index of the cladding and $n_j$ is the refractive index of the coating. Thickness of antireflection layer $$t = \lambda/4(n_c^2 - n_a^2)^{0.5}$$

$$t \approx \lambda/4n_c^{0.5}(n_j - n_c)^{0.5}$$

wherein $\lambda$ is the wavelength in-vacuo of the light.

Neither the thickness nor the value of the refractive index are critical, and a substantial improvement in transfer across the interface will result for a range of thicknesses or wavelengths. Where a very wide spectral range must be accommodated it will generally be beneficial to optimise at shorter wavelengths within the operating spectral range.

In the case of the specific example of a silica fibre provided with an acrylate protective coating, the refractive index $n_c$ of the cladding layer is 1.46 while the refractive index $n_j$ of a typical acrylate protective coating is 1.54. Therefore the optimum refractive index $n_a$ of the antireflection coating is 1.50. For an operating wavelength of 1.3μm the optimum coating thickness is 0.84μm. A substantial reduction in Fresnel reflection therefore can be provided by the use of an antireflection coating 80 comprising an approximately 1μm thick acrylate coating of a material having a refractive index $n_a = 1.52$. Such acrylates are commercially available and can be applied at this thickness to a silica optical fibre using the type of coating apparatus presently used for the provision of conventional acrylate protective coatings on such fibre, such as for instance a coating application substantially as described in UK Patent Application GB 2173708A.

We claim:

1. A coupling device for coupling light into or out of an optical fibre intermediate of its two ends, which device induces microbending of the optical fibre with a spatial periodicity to effect optical coupling between the fundamental bound mode of the fibre and a cladding mode by gripping the fibre between first and second surfaces respectively of a coupling element and a cooperating member, wherein said second surface is transversely ribbed and said first surface extends rectilinearly in the axial direction of the fibre and has no transverse ribbing and wherein said optical coupling element is provided with a reflective cylindrical or conical surface positioned such that light launched into the coupling element from said bound mode via said cladding mode and making a direct reflection in said surface is substantially collimated by making that reflection.

2. A coupling device as claimed in claim 1, wherein the optical coupling element is provided with a reflective conical surface and with a channel for locating the fibre on the axis of the conical surface.

3. A coupling device as claimed in claim 1, wherein the optical coupling element is provided with two reflective conical surfaces with a common axis and oppositely directed tapers, wherein the element is also provided with a channel for locating the fibre on the common axis of said two reflective conical surfaces.

4. A coupling device as claimed in claim 1, wherein the optical coupling element is provided with a reflective cylindrical surface and with a channel for locating the fibre on the focal line of that cylindrical surface.

5. A non-intrusive tap for coupling a signal into an optical fibre intermediate its two ends, which tap includes an optical source optically coupled with the optical coupling element of an optical coupling device as claimed in claim 1.

6. A non-intrusive tap as claimed in claim 5, wherein a Fresnel reflection reducing layer having a thickness in the range 0.2 to 3μm is interposed between the optical cladding of the fibre and a protective layer whose refractive index is greater than that of the optical cladding, and wherein the refractive index of the Fresnel reflection reducing layer is intermediate that of said optical cladding and that of said protective layer.

7. A non-intrusive tap for coupling a signal out of an optical fibre intermediate its two ends, which tap includes an optical detector optically coupled with the optical coupling element of an optical coupling device as claimed in claim 1.

8. A non-intrusive tap as claimed in claim 7, wherein a Fresnel reflection reducing layer having a thickness in the range 0.2 to μm is interposed between the optical cladding of the fibre and a protective layer whose refractive index is greater than that of the optical cladding, and wherein the refractive index of the Fresnel reflection reducing layer is intermediate that of said optical cladding and that of said protective layer.

9. A non-intrusive tap for coupling a first signal into an optical fibre, and a second signal out of said fibre, which tap includes an optical source and an optical detector optically coupled with the optical coupling element of an optical coupling device as claimed in claim 1.

10. A non-intrusive tap as claimed in claim 9 wherein a Fresnel reflection reducing layer having a thickness in the range 0.2 to 3μm is interposed between the optical cladding of the fibre and a protective layer whose refractive index is greater than that of the optical cladding, and wherein the refractive index of the Fresnel reflection reducing layer is intermediate that of said optical cladding and that of said protective layer.

11. An optical fibre transmission network including a plurality of non-intrusive taps, each of which taps includes an electro-optic transducer optically coupled with the optical element of an optical coupling device as claim in claim 1.

* * * * *